(12) United States Patent
Stemper et al.

(10) Patent No.: US 11,596,950 B2
(45) Date of Patent: Mar. 7, 2023

(54) MATERIAL PROCESSING PLANT

(71) Applicant: Terex USA, LLC, Westport, CT (US)

(72) Inventors: Michael Peter Stemper, Marion, IA (US); Ryan Anthony Mumm, Newhall, IA (US); Alex Ross, Washington, IA (US); Edwin J. Sauser, Monticello, IA (US)

(73) Assignee: Terex USA, LLC, Westport, CT (US)

( * ) Notice: Subject to any disclaimer, the term of this patent is extended or adjusted under 35 U.S.C. 154(b) by 313 days.

(21) Appl. No.: 16/775,510

(22) Filed: Jan. 29, 2020

(65) Prior Publication Data

US 2020/0164382 A1 May 28, 2020

Related U.S. Application Data

(62) Division of application No. 15/080,112, filed on Mar. 24, 2016, now Pat. No. 10,576,477.

(60) Provisional application No. 62/137,573, filed on Mar. 24, 2015.

(51) Int. Cl.
| | |
|---|---|
| *B02C 21/02* | (2006.01) |
| *B07B 1/00* | (2006.01) |
| *B65G 21/00* | (2006.01) |
| *B02C 23/08* | (2006.01) |
| *B02C 23/02* | (2006.01) |

(52) U.S. Cl.
CPC .............. *B02C 21/02* (2013.01); *B02C 23/02* (2013.01); *B02C 23/08* (2013.01); *B07B 1/005* (2013.01); *B65G 21/00* (2013.01)

(58) Field of Classification Search
CPC ......... B02C 21/02; B02C 23/02; B02C 23/08; B07B 1/00; B07B 1/005; B65G 21/00; B65G 21/06; B65G 21/10
USPC .......................................................... 209/421
See application file for complete search history.

(56) References Cited

U.S. PATENT DOCUMENTS

| | | | | |
|---|---|---|---|---|
| 5,647,545 A | * | 7/1997 | Conner ................... | B02C 21/02 241/101.76 |
| 5,655,719 A | * | 8/1997 | Getz ....................... | B02C 21/02 241/34 |
| 5,878,967 A | * | 3/1999 | Conner ................... | B02C 21/02 241/101.76 |
| 6,186,338 B1 | * | 2/2001 | Douglas ................. | B02C 21/02 209/244 |
| 6,698,594 B2 | * | 3/2004 | Cohen .................... | B07B 1/005 209/421 |

(Continued)

FOREIGN PATENT DOCUMENTS

| | | | | |
|---|---|---|---|---|
| CN | 101330989 A | * | 12/2008 | ............... B07B 1/46 |
| DE | 60125640 T2 | * | 10/2007 | ............ B02C 21/026 |

(Continued)

*Primary Examiner* — Gene O Crawford
*Assistant Examiner* — Muhammad Awais
(74) *Attorney, Agent, or Firm* — Simmons Perrine Moyer Bergman PLC

(57) ABSTRACT

A mobile recycling plant with a single diesel engine to power the crusher intermittently and the generator continuously, with a return conveyor discharge chute 502 that is automatically stowed by merely folding the top portion of the return conveyor, with an automatic retraction of the return conveyor 130 by merely lower the screening machine, with a dual screen dual angle screening machine, and with a system for deploying a ferrous metal removal system 160.

13 Claims, 8 Drawing Sheets

(56) References Cited

U.S. PATENT DOCUMENTS

| | | | |
|---|---|---|---|
| 6,705,449 B2 * | 3/2004 | Wagstaffe | B02C 21/02 |
| | | | 209/241 |
| 9,895,696 B2 | 2/2018 | Hamilton et al. | |
| 2009/0173671 A1 * | 7/2009 | O'Keeffe | B07B 1/46 |
| | | | 209/421 |
| 2010/0193619 A1 * | 8/2010 | Robinson | B02C 21/026 |
| | | | 241/245 |
| 2013/0037455 A1 * | 2/2013 | Irwin | B07B 1/286 |
| | | | 209/257 |
| 2013/0168208 A1 * | 7/2013 | Erkkila | B65G 41/007 |
| | | | 198/618 |
| 2014/0158798 A1 * | 6/2014 | Cohen | B02C 23/08 |
| | | | 241/24.1 |
| 2014/0166592 A1 * | 6/2014 | Holton | E21B 21/06 |
| | | | 210/330 |
| 2014/0202835 A1 * | 7/2014 | Watters | B65G 21/12 |
| | | | 198/812 |
| 2014/0224906 A1 * | 8/2014 | Dunn | B02C 21/026 |
| | | | 209/241 |

FOREIGN PATENT DOCUMENTS

| | | | | |
|---|---|---|---|---|
| GB | 2351247 A * | 12/2000 | | B07B 1/005 |
| KR | 101436785 B1 * | 1/2014 | | |
| KR | 101436785 B1 * | 9/2014 | | |
| WO | WO-2010102232 A2 * | 9/2010 | | B07B 13/16 |
| WO | WO-2015033013 A1 * | 3/2015 | | B02C 21/02 |

* cited by examiner

MATERIAL PROCESSING PLANT

CROSS REFERENCE TO RELATED APPLICATIONS

This application is a divisional of the application with the same inventors filed on Mar. 24, 2016, and having Ser. No. 15/080,112, which claims the benefit of the filing date of the provisional patent application with the same inventors filed on Mar. 24, 2015, and having Ser. No. 62/137,573, which application is incorporated herein by reference in its entirety.

FIELD OF THE INVENTION

The present invention relates to improved systems and methods for processing aggregate and recycled material.

BACKGROUND OF THE INVENTION

The present invention relates generally to material processing plants and more particularly to mobile recycling plants and methods of constructing and utilizing the same.

More particularly, the present invention relates to portable, self-contained and efficient material processing plants.

SUMMARY OF THE INVENTION

It is an object of the present invention to provide an efficient material processing plant.

It is a feature of the present invention to include a single on-board drive engine, which powers a crusher and an electric generator even when the crusher is not operating.

It is an advantage of the present invention to provide for efficient use of limited drive engine resources on a mobile material processing plant.

It is another feature of the present invention to include a return conveyor chute which automatically moves to a transport configuration by the folding of the head portion of the return conveyor.

It is another advantage of the present invention to allow for quick and safe preparation of a mobile material processing plant from ground level.

It is another feature of the present invention to include a retractable under crusher conveyor.

It is another advantage of the present invention to provide for improved ground clearance of an under crusher conveyor by merely lowering the screen for transport.

It is another feature of the present invention to provide a multi-deck screen where the decks are not parallel.

It is another advantage of the present invention to increase scalping capacity of the screen on the material processing plant.

It is another feature of the present invention to include an adjustable magnet support with bi-directional discharge chute.

It is another advantage of the present invention to allow for efficient conversion from an operational state to a transport state.

The present invention is designed to achieve the above-mentioned objectives, include the previously stated features, and provide the aforementioned advantages.

An embodiment of the present invention is a mobile recycling plant which comprises: a means for continuously powering a generator and an intermittent crusher from a single engine; a means for lowering a return conveyor discharge chute by lowering a non-attached return conveyor; a means for increasing ground clearance by lowering the screen to a transport positon; means for screening material on decks of a multi-deck screen with different speeds at which overs flow of the screen; and means for rapidly stowing a ferrous metal removal system with reduced human effort.

DETAILED DESCRIPTION OF THE INVENTION

Figure 1:
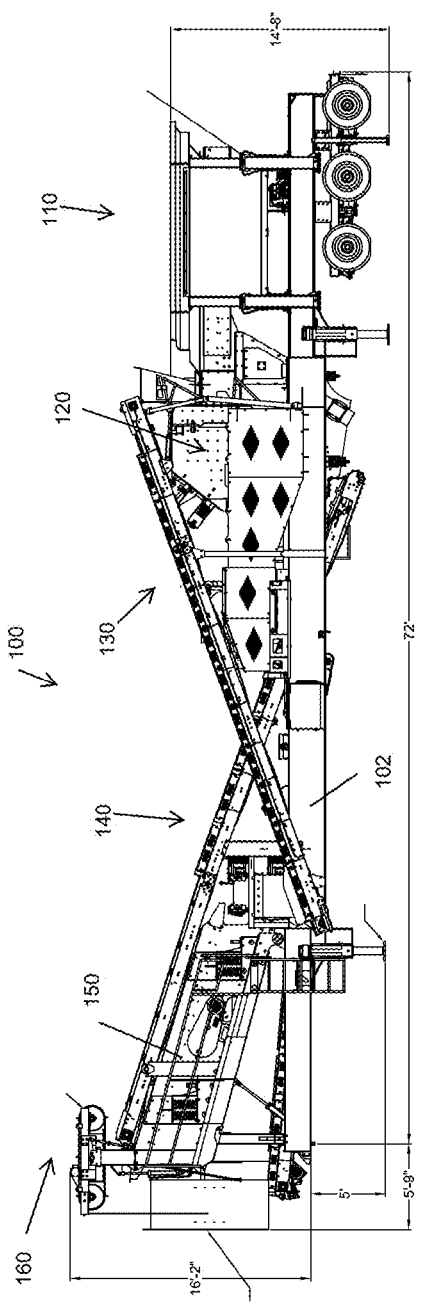
FIG. 1 is an elevation view of the recycle plant in accordance with the invention in an operational configuration.

Now referring to the drawings wherein like numerals refer to like structure shown in the drawings and text included in the application throughout. With reference to FIG. 1, there is shown a new and useful recycle plant, generally designated 100. The system includes a removable recycle plant feeder 110, which could be a simple hopper, conveyor, grizzly bars, any suitable substitutes or combinations thereof. The module could include a grizzly fine feeder pan. Also shown is a recycle plant crusher 120, which could be any type of crusher, including a horizontal shaft impact crusher. A return conveyor 130 is shown, which takes overs from the dual non-parallel deck screen 150 and delivers it back to the recycle plant crusher 120. The output of recycle plant crusher 120 and the grizzly fines are taken on under crusher to screen conveyor 140 to the dual non-parallel deck screen 150 where it is distributed out or recycled back to recycle plant crusher 120 via return conveyor 130. At the feed end of dual non-parallel deck screen 150, there is an optional ferrous metal removal system 160. All of this structure is preferably mounted on a mobile platform, which includes vehicular frame 102 and wheels.

Figure 2:
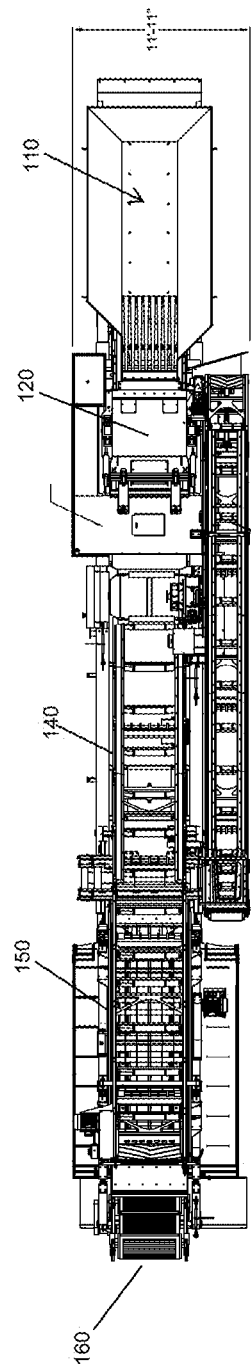
FIG. 2 is a plan view of the recycle plant of FIG. 1 in a transport configuration.

Now referring to FIG. 2, there is shown a top view of the system 100 of FIG. 1 but after it has been configured into a transport configuration.

Figure 3:
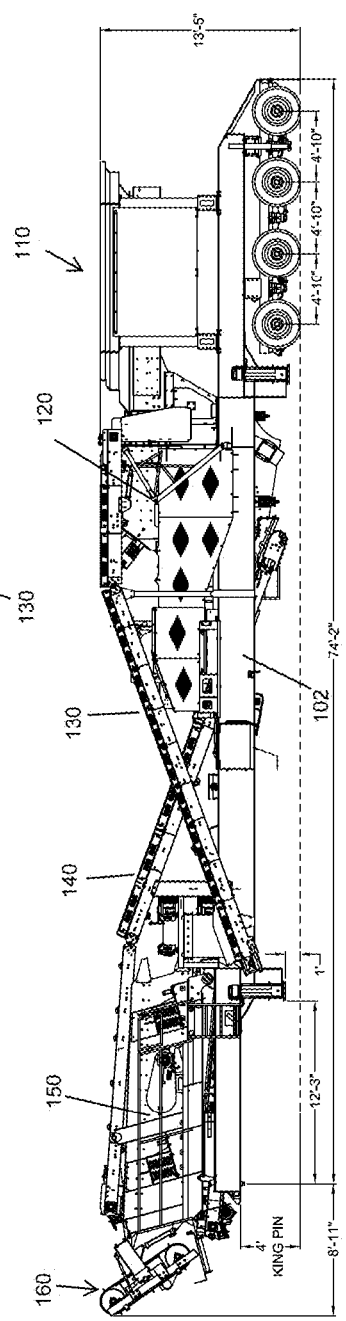
FIG. 3 is an elevation view of the recycle plant of FIG. 1 in a transport configuration.

Now referring to FIG. 3, there is shown an elevation view of the system 100 of FIG. 2.

Figure 4:
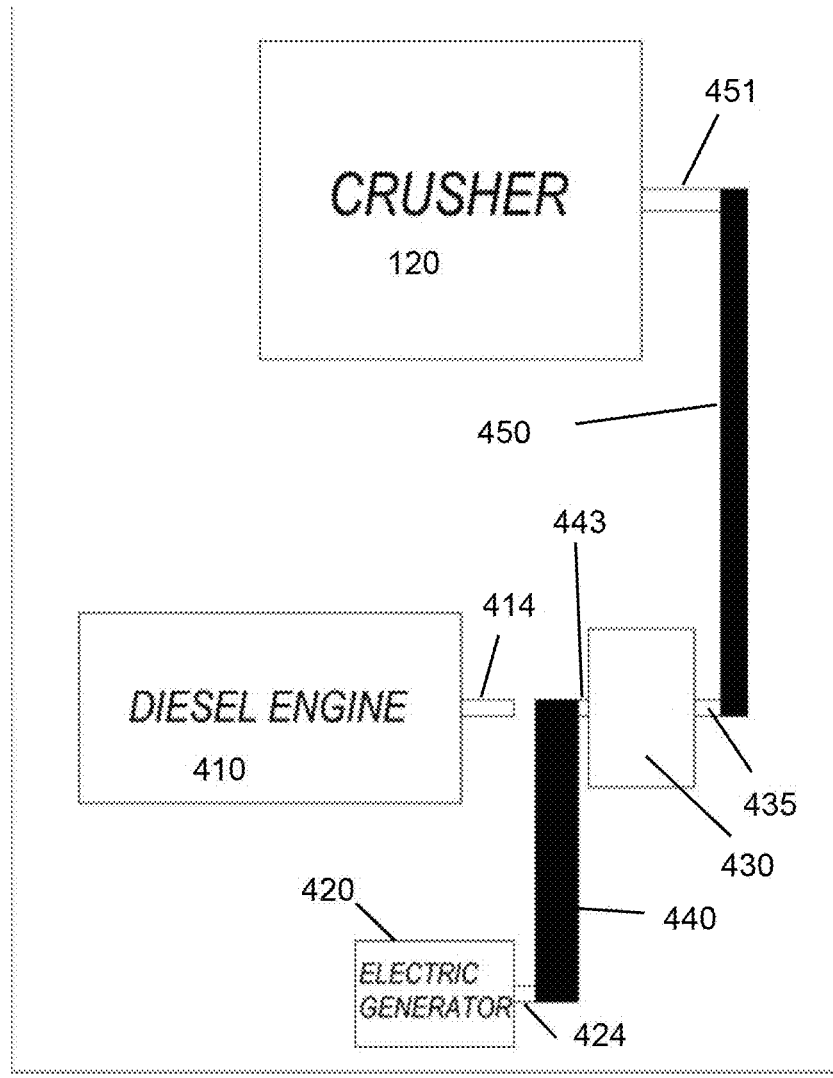
FIG. 4 is a functional block diagram view of an embodiment of the present invention.

Now referring to FIG. 4, there is shown a novel aspect of the present invention which includes: a diesel engine 410 to power both the crusher 120 and an electric generator 420. This drive configuration is unique due to the configuration of the diesel engine 410, the generator 420, the fluid coupler 430, and the crusher 120 drive on a portable diesel/electric asphalt/concrete recycle plant. Our unique configuration allows the crusher drive to be engaged or disengaged via remote electrical operation of the switchable on/off control of the fluid coupler 430 while the electric generator 420 continues to be driven by the diesel engine 410. This allows all electric functions on the plant to be operated while the crusher is turned off. Electric generator 420 may be a belt or other belt driven from the diesel engine 410. A common multi-groove sheave could drive both the electric generator 420 and the recycle plant crusher 120 with opposed crusher and generator drive belts that minimize side load on the fluid coupler 430 bearings and shaft. The present invention also includes novel methods of operation involving manipulation of the various components include but not limited to: A method of driving a mobile recycling plant comprising the steps of:

providing a mobile material processing plant which comprises:
a crusher 120;
a diesel engine 410;
an electric generator 420;
a fluid coupler 430; and
providing rotary power from said diesel engine 410 to said electric generator 420 and to said fluid coupler 430 and on to said crusher 120, so that said electric generator 420 can be powered continuously while said crusher 120 is powered on and off repeatedly.

Figure 5:
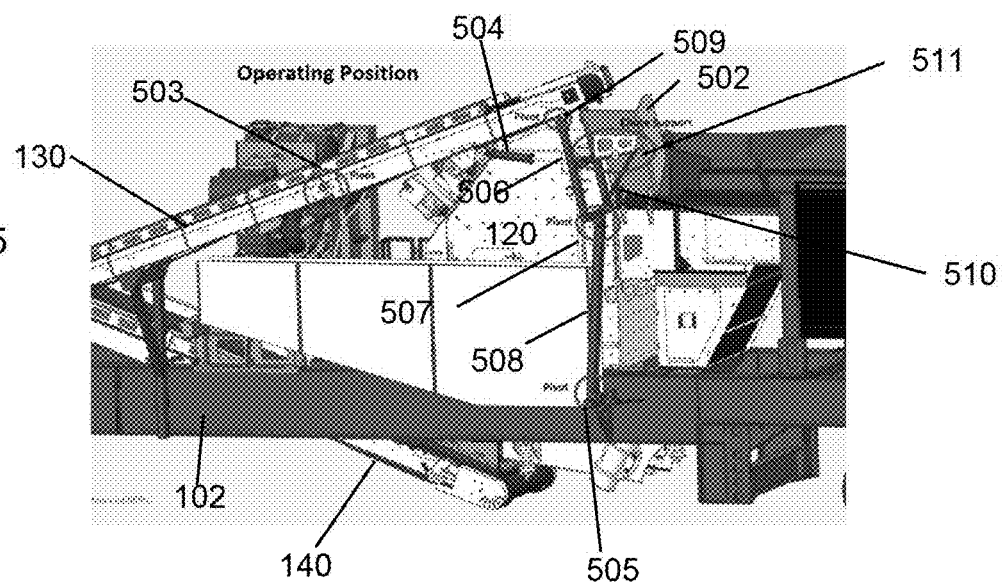
FIG. 5 is a close up perspective view of a portion of FIG. 1.
Figure 6:
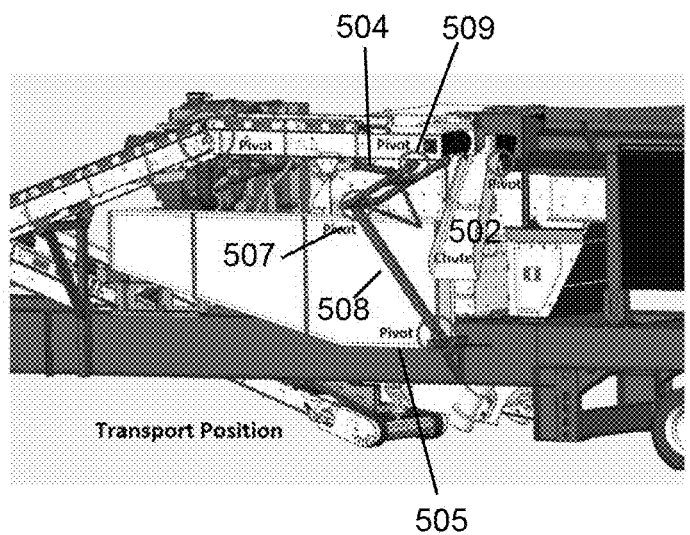
FIG. 6 is a close up perspective view of a portion of FIG. 3.

Now referring to FIGS. 5 and 6, there is shown another novel aspect of the present invention which comprises: conveyor 130 that recirculates classified material back to the crusher 120. The conveyor has two positions, operating position, and transport position. The head end of the conveyor 130 is hydraulically folded down for transport. This folding conveyor 130 is unique because the conveyor support/linkage also supports a chute 502 that catches material coming off the conveyor.

More specifically, in FIG. 5 the underside of return conveyor discharge chute 502 is shown, while in FIG. 6 the inside or top surface of return conveyor discharge chute 502 is shown. The return conveyor 130 and return conveyor discharge chute 502 become securely supported adjacent to each other (without being attached) when return conveyor 130 is positioned for operation (FIG. 5). When the head portion of return conveyor 130 is merely folded down (at return conveyor mid to head pivot location 503, FIGS. 5 and 712 in FIG. 8) for transport by retracting return conveyor head hydraulic cylinder 504, return conveyor head support top member 506 (pivots from the return conveyor 130 at return conveyor head support top pivot location 509) and return conveyor head support bottom member 508 (which pivots from vehicular frame 102 at return conveyor head support bottom pivot location 505) are pivoted away via intermediate return conveyor head support mid pivot location 507, from the underside of chute 502, which then automatically pivots around its feeder connected end down to its travel position. The unique configuration of these components allows the operator to quickly and safely prepare the plant for transport from ground level, by merely lowering the head of the return conveyor 130, which automatically allows the return conveyor discharge chute 502 to pivot downward. The present invention also includes novel methods of operation involving manipulation of the various components include but not limited to: A method of lowering a return conveyor discharge chute 502 comprising the steps of:

providing:
a recycle plant crusher 120;
a dual non-parallel deck screen 150;
return conveyor 130;
a return conveyor discharge chute 502;
a return conveyor head support top member 506;
a return conveyor head support bottom member 508;
a return conveyor head support mid pivot location 507;
a return conveyor head support mid angled structure 510;
a return conveyor head hydraulic cylinder 504; and
moving said return conveyor head support top member 506 with said return conveyor head hydraulic cylinder 504 and causing a head portion of said return conveyor 130 to become lower while automatically removing support from said return conveyor discharge chute 502 which pivots downward into a transport configuration.

Figure 7:
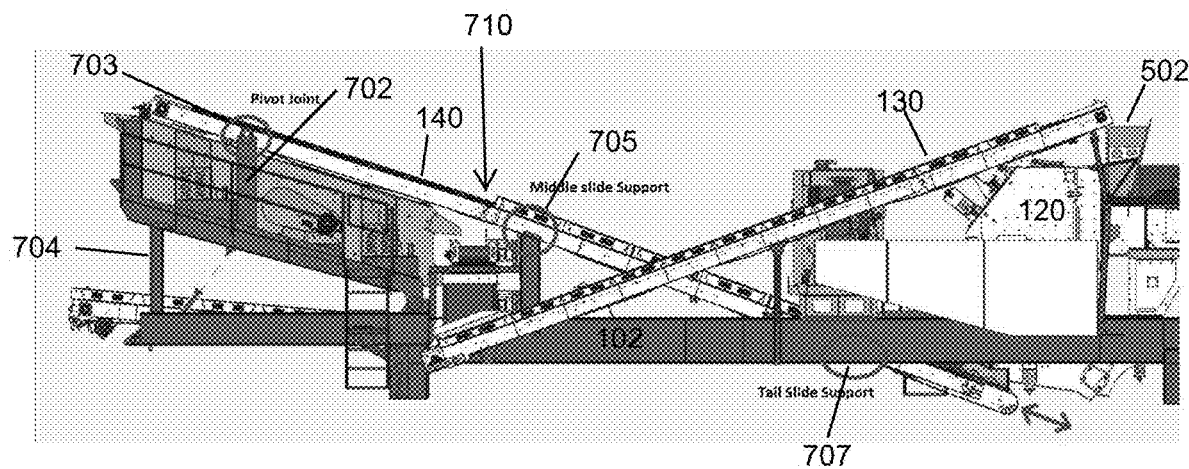
FIG. 7 is a close up elevation view of a portion of FIG. 1.
Figure 8:
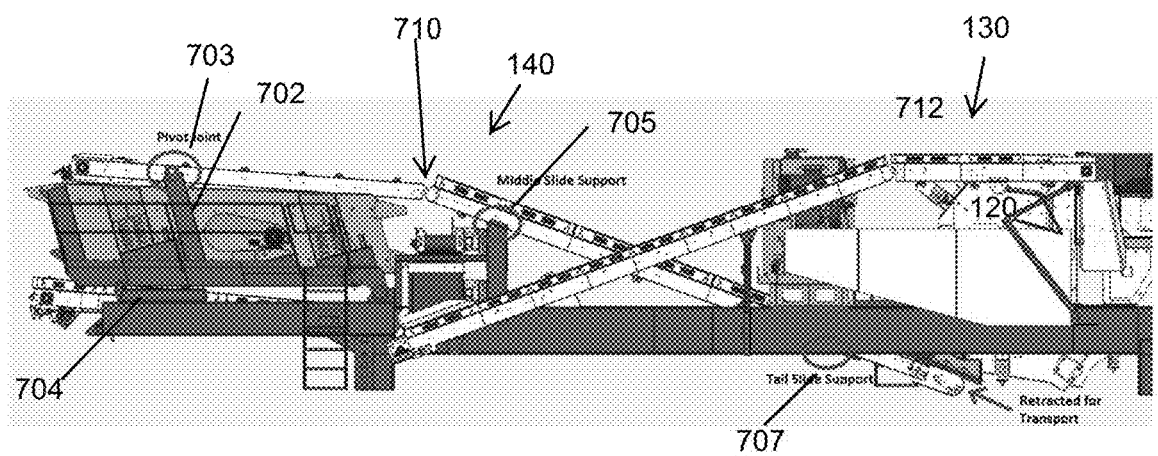
FIG. 8 is a close up elevation view of a portion of FIG. 3.

Now referring to FIGS. 7-8, there is shown a retracting under crusher conveyor 140 that slides from its transport position to its operating position. The motion of this conveyor is unique because of the method in which the motion is driven. The under crusher conveyor is supported in three areas, tail, middle, and head sections. The head of the conveyor is connected to the screen base by a pivot joint 703. The middle and tail sections of the conveyor are supported by rigid supports 705 and 707 that allow the conveyor to slide in one plane. When the screen base is lowered (FIG. 8) by pivoting screen feed end operational support post 704 downward, under crusher to screen conveyor 140 folds at under crusher to screen conveyor folding point 710, and a reaction force is created at the screen frame to conveyor support post 702, and post to conveyor pivot joint 703. This reaction force translates/pulls/slides the tail of under crusher to screen conveyor 140 up in a single plane of motion. Consequently, merely lowering the support structure for dual non-parallel deck screen 150 and decreasing the maximum height, it automatically increases ground clearance. The present invention also includes novel methods of operation involving manipulation of the various components include but not limited to: A method of increasing transport ground clearance on a mobile recycling plant comprising the steps of:

providing:
vehicular frame 102;
a recycle plant crusher 120;
a dual non-parallel deck screen 150;
under crusher to screen conveyor 140;
screen feed end operational support post 704;
conveyor middle slide support 705; and
lowering a feed end of said dual non-parallel deck screen 150 toward a vehicular frame 102, so that said under crusher to screen conveyor 140 is caused to be folded; a tail end of said under crusher to screen conveyor 140 is translated in a direction such that ground clearance of said mobile recycling plant is increased.

Figure 9:
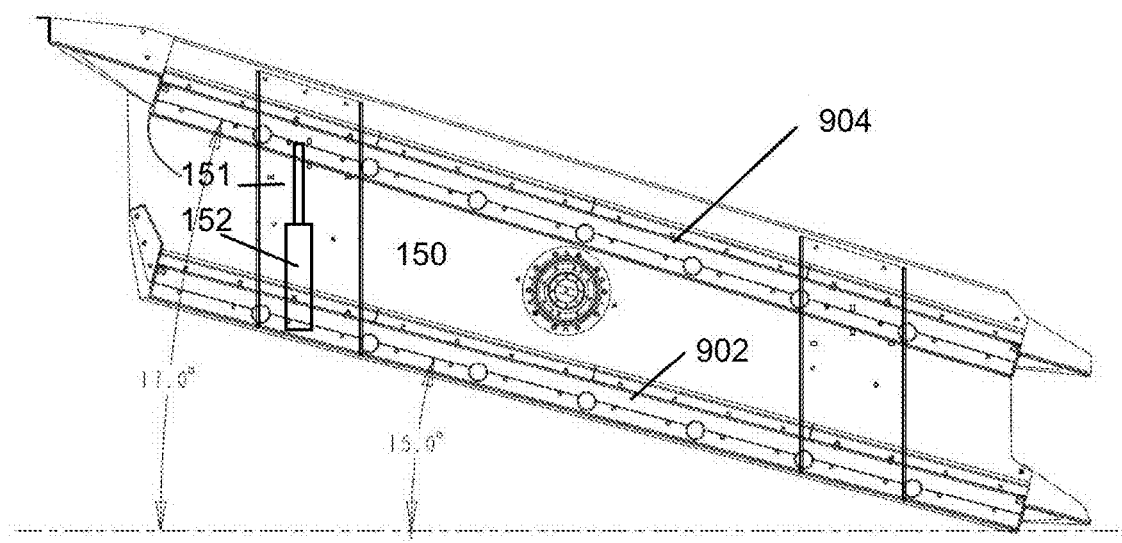
FIG. 9 is a schematic view of a multi-deck screen with non-parallel decks of the present invention.
Figure 10:
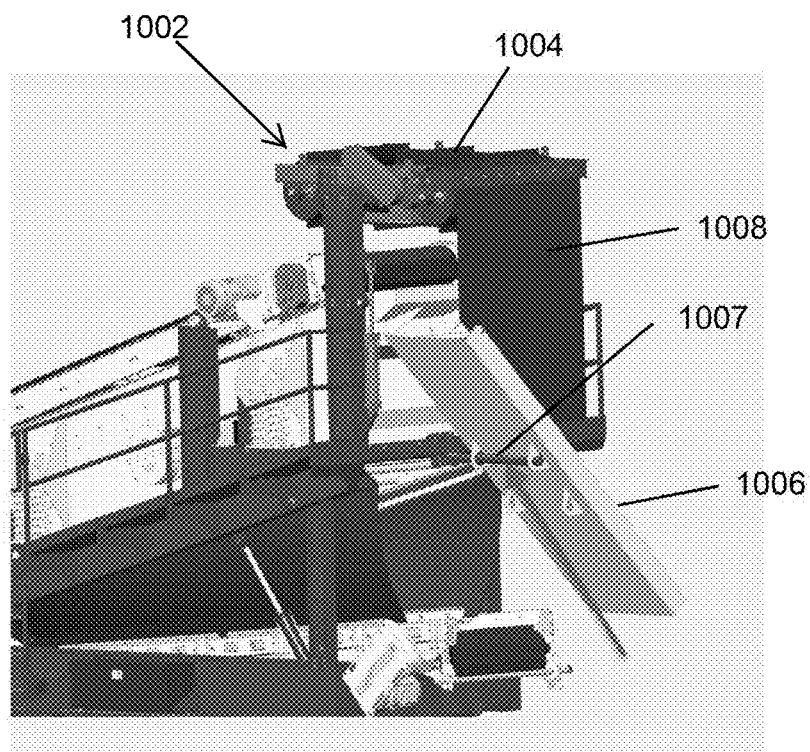
FIG. 10 is a perspective view of a portion of the recycle plant in FIG. 1.
Figure 11:
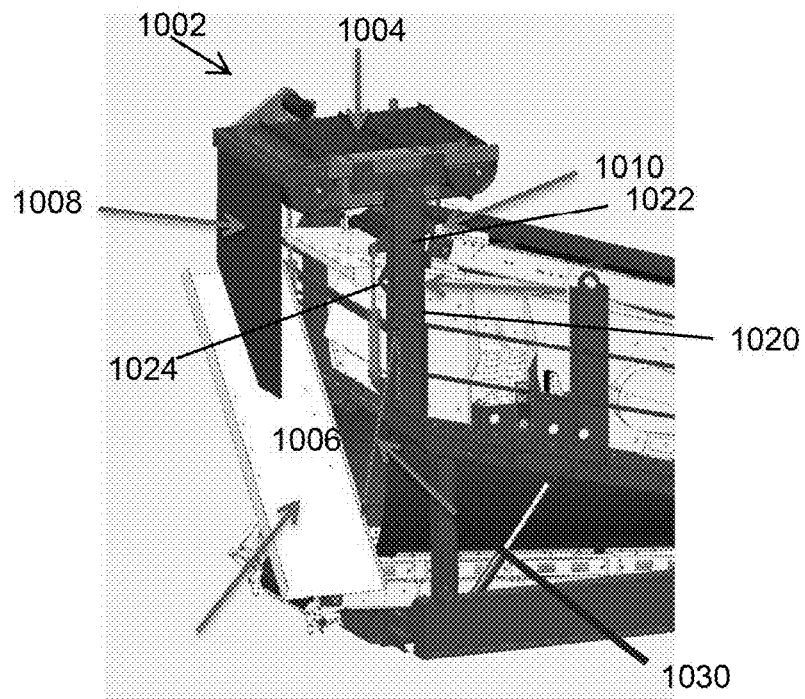
FIG. 11 is a different perspective view of a portion of the recycle plant in FIG. 1.

Now referring to FIG. 9, there is shown another novel aspect of the present invention which represents a typical single shaft material processing vibrating screen machine (the details of which are well known to a person skilled in the art), except, in the present invention, there are two screens within the vibrating screen machine that have different angles with respect to a common horizontal reference. More specifically, in one embodiment, the invention comprises a 5'×16' double deck screen to classify material. The upper screen 904 and the lower screen 902 are similarly sized but are not parallel with respect to each other. Here they are shown separated by a two-degree angle. In an effort to increase screening capacity, the top deck is at 17 degrees with respect to a horizontal, while the bottom deck operates at 15 degrees. The dual non-parallel deck screen 150 could be configured with other than two degrees between the upper screen 904 and the lower screen 902. Also, one or both the lower screen 902 or the upper screen 904 could be mounted within the screen on supports that are angularly adjustable so as to provide for variable control of the angular difference and respective orientation between the screens. This adjustment could involve hydraulic adjustment of the supports (hydraulic cylinder with inner portion 151 and outer portion 152) or other suitable adjustment means, or the adjustment system could involve multiple extra holes in the supports and multiple different holes in the structures which hold the supports, and a plurality of fasteners such a huckbolts or any suitable substitute structure capable of mounting a screen at variable angles within the screen. The present invention also includes novel methods of operation involving manipulation of the various components include but not limited to: A method of screening aggregate material comprising the steps of:
  providing a screening machine with a plurality of decks, where one of said plurality of decks has a different angle with respect to a horizontal line than another of said plurality of decks; and
  operating said screening machine so that overs material flows along a top surface of one of said plurality of decks at a first speed which is faster than a second speed which overs materials flows across another of said plurality of decks.

Now referring to FIGS. 10-13, there is shown a ferrous metal removal system 160 with a magnet to attract and reject ferrous materials from the processed aggregate. The magnet used on the system is supported by a unique structure that allows the magnet to hydraulically fold to a lower position for transport, this structure comprises: magnet lower support structure 1020, magnet upper support structure 1022, turn-buckle 1010, intermediate magnet support structure pivot joint 1024, intermediate magnet support structure hydraulic cylinder 1028.

Ferrous metal removal system 160 further comprises magnet conveyor assembly 1002, which comprises magnet conveyor surface 1004. Trap iron or other ferrous material is moved by magnet conveyor surface 1004, which falls, with the aid of rubber curtain 1008, in magnet discharge chute 1006 (which is supported by chute support 1007 and chute support chain 1030) and discharges it to the side of the plant for collection. The magnet discharge chute uses a unique support that allows easy repositioning. The magnet discharge chute is rotated to its horizontal position for transport. This allows room for the magnet to be folded to its transport position. The magnet discharge chute has the ability to discharge on either side of the plant. The magnet discharge chute is supported on a pivot joint and by chute support chain 1030.

Figure 12:
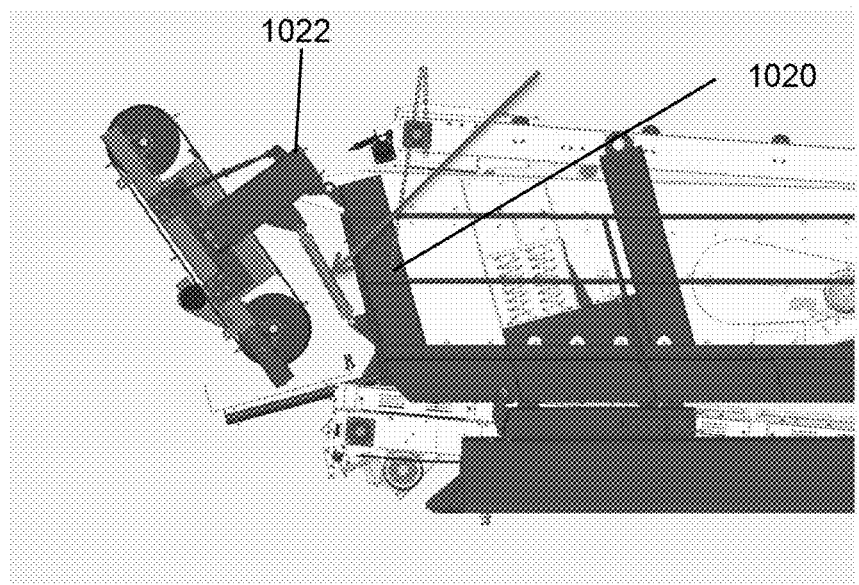
FIG. 12 is a close up elevation view of a different portion of FIG. 3.
Figure 13:
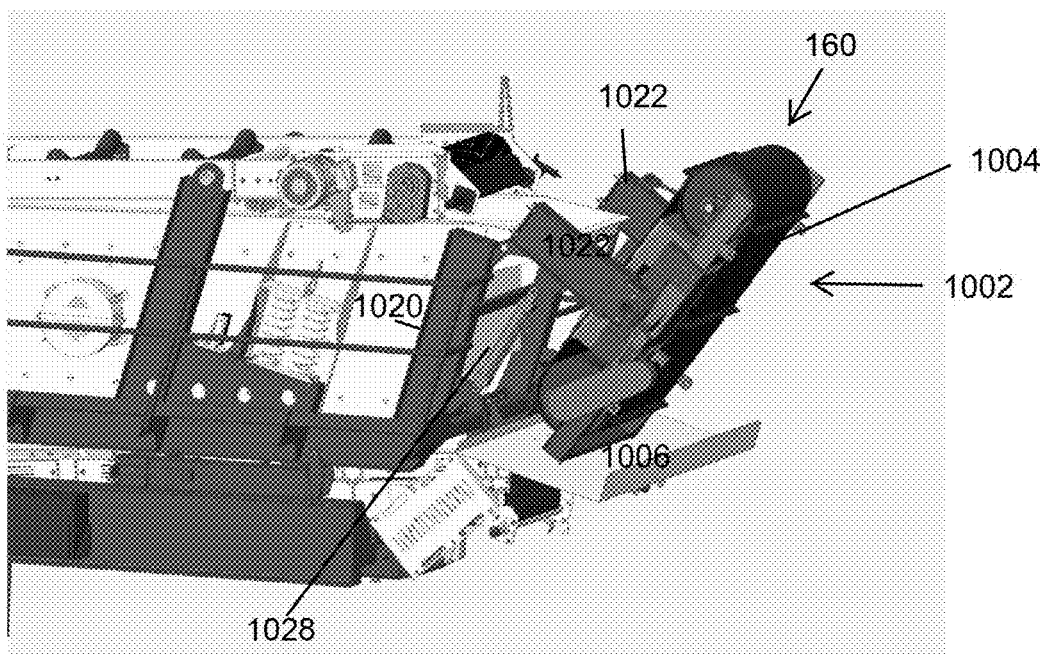
FIG. 13 is a close up perspective view of a portion of the recycle plant of FIG. 3.

FIGS. 12 and 13 show the ferrous metal removal system 160 in a transport configuration. The present invention also includes novel methods of operation involving manipulation of the various components include but not limited to: A method of preparing a ferrous metal removal system 160 on a mobile recycling plant for transport comprising the steps of:
  providing:
    a magnet conveyor assembly 1002;
    a magnet conveyor surface 1004;
    a magnet discharge chute 1006;
    a chute support 1007;
    a turn buckles 1010;
    a magnet lower support structure 1020;
    a magnet upper support structure 1022;
    an intermediate magnet support structure pivot joint 1024;
    an intermediate magnet support structure hydraulic cylinder 1028;
    a chute support chain 1030;
  actuating said intermediate magnet support structure hydraulic cylinder 1028 and causing said magnet conveyor assembly 1002 to pivot with said magnet upper support structure 1022 above said magnet lower support structure 1020, so as to reduce a maximum height characteristic of said magnet conveyor assembly 1002; and
  raising a lower end of said return conveyor discharge chute 502 via applying force so said chute support chain 1030.

Although the invention has been described in detail in the foregoing only for the purpose of illustration, it is to be understood that such detail is solely for that purpose and that variations can be made therein by those of ordinary skill in the art without departing from the spirit and scope of the invention as defined by the following claims, including all equivalents thereof.

It is thought that the method and apparatus of the present invention will be understood from the foregoing description, and that it will be apparent that various changes may be made in the form, construct steps, and arrangement of the parts and steps thereof, without departing from the spirit and scope of the invention, or sacrificing all of their material advantages. The form herein described is merely a preferred exemplary embodiment thereof.

What is claimed is:

1. A system for increasing transport ground clearance on a mobile recycling plant comprising:
  providing:
    a vehicular frame;
    a recycle plant crusher;
    a dual non-parallel deck screen;
    under crusher discharge to screen conveyor; sized, configured and located, so that material discharged from said recycle plant crusher can be transported thereon to said dual non-parallel deck screen;
    screen feed end operational support post;
    conveyor middle slide support; and
    said dual non-parallel deck screen, said under crusher discharge to screen conveyor; said conveyor middle slide support being combined and configured in operative combination so that when said dual non-parallel deck screen is lowered said under crusher discharge to screen conveyor is caused to be folded and a tail end of said under crusher discharge to screen conveyor is translated in a direction such that ground clearance of said mobile recycling plant is increased.

2. A system for increasing transport ground clearance on a mobile recycling plant comprising:
  a frame;
  a crusher;
  a non-parallel deck screen;
    a crusher to screen conveyor; sized, configured and located, so that material discharged from said crusher can be transported thereon to said non-parallel deck screen;
  a screen feed end support post;
  a conveyor middle support; and
  said non-parallel deck screen, said crusher to screen conveyor; said conveyor middle support being combined and configured in operative combination so that when said non-parallel deck screen is lowered said crusher to screen conveyor is caused to be folded and a tail end of said crusher to screen conveyor is translated in a direction such that ground clearance of said mobile recycling plant is increased.

3. The system of claim 2 wherein said frame is a vehicular frame.

4. The system of claim 2 wherein said crusher is a recycle plant crusher.

5. The system of claim 2 wherein said non-parallel deck screen is a dual non-parallel deck screen.

6. The system of claim 2 wherein said crusher to screen conveyor is an under crusher to screen conveyor.

7. The system of claim 2 wherein said screen feed end support post is a screen feed end operational support post.

8. The system of claim 2 wherein said conveyor middle support is a conveyor middle slide support.

9. The system of claim 2 wherein said non-parallel deck screen, said crusher to screen conveyor; said conveyor middle support being combined and configured in operative combination so that when said non-parallel deck screen is moved said crusher to screen conveyor is caused to be reoriented and a portion of said crusher to screen conveyor is moved such that ground clearance of said mobile recycling plant is increased.

10. A system for increasing transport ground clearance on a mobile recycling plant comprising:

a frame;
a crusher;
a screen;
   a crusher to screen conveyor; sized, configured and located, so that material discharged from said crusher can be transported thereon to said screen;
a screen feed end support post;
a conveyor support; and
said screen, said crusher to screen conveyor; said conveyor support being combined and configured in operative combination so that when said screen is moved said crusher to screen conveyor is caused to be reoriented and a portion of said crusher to screen conveyor is moved such that ground clearance of said mobile recycling plant is changed.

11. The system of claim 10 wherein said screen is a non-parallel deck screen.

12. The system of claim 10 wherein said conveyor support is a conveyor middle support.

13. The system of claim 10 wherein said screen, said crusher to screen conveyor; said conveyor support being combined and configured in operative combination so that when said screen is lowered said crusher to screen conveyor is caused to be folded and a portion of said crusher to screen conveyor is translated such that ground clearance of said mobile recycling plant is increased.

* * * * *